(12) United States Patent
Meiler

(10) Patent No.: US 6,540,351 B1
(45) Date of Patent: Apr. 1, 2003

(54) ARRANGEMENT COMPRISING AN ENDPIECE, A TEMPLE HEADPIECE AND A HINGE FOR SPECTACLES

(75) Inventor: Rudolf Meiler, Schiers (CH)

(73) Assignee: Eye-Systems GmbH, Chur (CH)

( * ) Notice: Subject to any disclaimer, the term of this patent is extended or adjusted under 35 U.S.C. 154(b) by 0 days.

(21) Appl. No.: 10/156,649

(22) Filed: May 24, 2002

(30) Foreign Application Priority Data

Oct. 18, 2001 (DE) .......................................... 101 51 464

(51) Int. Cl.⁷ ................................................. G02C 5/14
(52) U.S. Cl. ........................ 351/116; 351/153; 16/228
(58) Field of Search ................................ 351/116, 111, 351/153, 140, 41; 2/450; 16/228

(56) References Cited

U.S. PATENT DOCUMENTS 5,351,328 A * 9/1994 Kakii et al. .................... 385/83
5,980,039 A * 11/1999 Schmid et al. ............... 351/153

FOREIGN PATENT DOCUMENTS

DE 19721306 11/1998

\* cited by examiner

*Primary Examiner*—Hung Dang
(74) *Attorney, Agent, or Firm*—Ware, Fressola, Van Der Sluys & Adolphson LLP

(57) ABSTRACT

An arrangement for spectacles comprises an endpiece (2) and a temple headpiece (4) as well as a hinge (6), hinge pin (26) rotatably inserted into a hinge hole (28), a radial opening (36) in the hinge eye is disposed on the side thereof which faces away from the outer sides of the temple headpiece and of the endpiece when the temple headpiece takes up its position of use. An abutment device comprises an abutment face (38) connected to the hinge eye as well as abutment parts (40) formed on the pin plates. The two pin plates are connected by a connecting wall (44) extending on the outer side of the temple headpiece or the endpiece parallel to the axis of the hinge pin and connecting the abutment parts to each other.

11 Claims, 1 Drawing Sheet

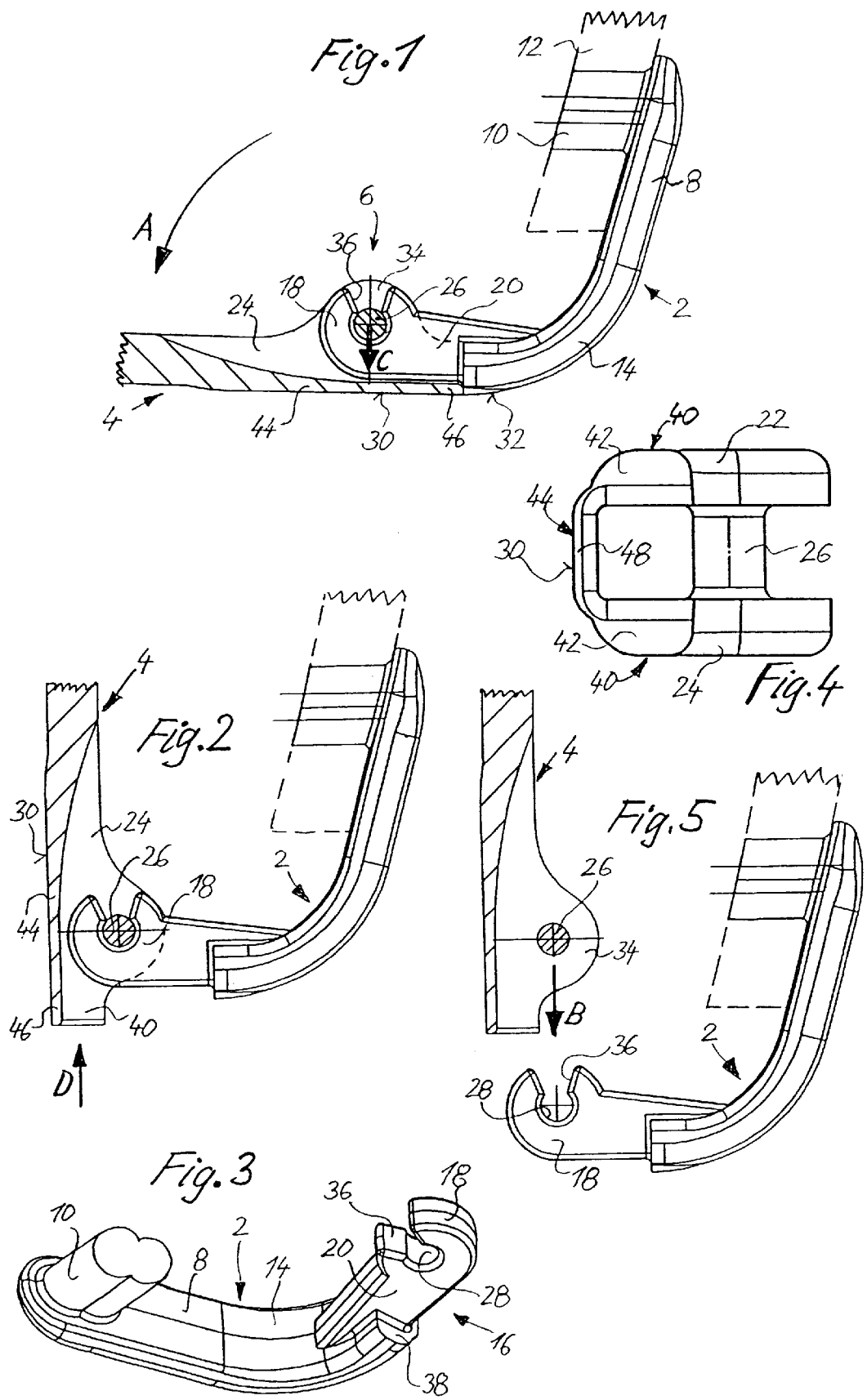

ARRANGEMENT COMPRISING AN ENDPIECE, A TEMPLE HEADPIECE AND A HINGE FOR SPECTACLES

CROSS REFERENCE TO RELATED APPLICATION

The present application discloses subject matter also disclosed and which may be claimed in co-owned, co-pending application Ser. No. 10/156,754, filed on even date herewith entitled "Rimless Spectacles".

BACKGROUND OF THE INVENTION

The invention relates to an arrangement having an endpiece for spectacles, a temple headpiece for the spectacles and a hinge.

Such an arrangement is known (DE 197 21 306 A1). In the known arrangement, the hinge eye is firmly connected to the endpiece. When viewed from above, the hinge eye is approximately V-shaped with the radial opening, starting from the hinge hole in the hinge eye, substantially extending towards the outer sides of the temple headpiece and the endpiece. The two pin plates are separated from each other by a gap or space which extends from the inner side of the temple headpiece to the outer side thereof and in which the hinge eye is disposed.

The advantage of this known arrangement is that the temple headpiece and the endpiece can be connected in a simple way by the hinge pin being inserted through the radial opening into the hinge hole. This, on the other hand, makes it possible to simplify the manufacture of the temple headpiece by manufacturing the latter including the hinge pin in one piece, for example by injection molding. The known arrangement has proved to be reliable in the use of the spectacles provided with this arrangement. It has, however, been observed that, when the spectacles are handled improperly, particularly when excessively strong forces act on the temple headpiece and attempt to pivot it beyond its position of use, the hinge has become loose and/or the abutment device has not fulfilled its function satisfactorily.

BRIEF SUMMARY OF THE INVENTION

The invention is based on the object of further developing the generic arrangement such that it maintains its operativeness even under an improperly great strain. In particular, a loosening of the hinge or even a breakage of the hinge eye shall be prevented, and it shall be ensured as far as possible that the temple headpiece cannot be pivoted beyond the desired position of use relative to the endpiece.

According to the invention, this problem is solved by the arrangement having an endpiece for spectacles, comprising a temple headpiece for the spectacles and a hinge for joining the endpiece and the temple headpiece in an articulated manner such that the temple headpiece is pivotable relative to the endpiece into a position of use, wherein the side of the temple headpiece which goes ahead when the pivoting into the position of use takes place forming the outer side of the temple headpiece and with the side of the endpiece adjoining the outer side of the temple headpiece, when the latter takes up its position of use, forming the outer side thereof, wherein the hinge includes a hinge eye having a hinge hole, a hinge pin rotatably inserted in the hinge hole as well as two pin plates between which the hinge eye is disposed and the one of which is connected to the one end and the other is connected to the other end of the hinge pin, wherein the two pin plates are firmly connected to the endpiece or the temple headpiece and the hinge eye is firmly connected to the respectively other of these parts (temple headpiece or endpiece), wherein the hinge eye consists of an injection-moldable plastic material and has a radial opening which extends in the radial direction with respect to the hinge hole, is open radially inwards and outwards and extends over the entire axial length of the hinge hole, wherein the radial opening and the hinge pin are dimensioned such that the hinge pin is insertable through the radial opening in the radial direction into the hinge hole and is removable therefrom, wherein the arrangement comprises an abutment device having an abutment face connected to the hinge eye as well as abutment parts formed on the pin plates, said abutment parts being adapted to abut on the abutment face and, thereby, preventing a swivel movement of the temple headpiece beyond its position of use, characterized in that, when the temple headpiece takes up its position of use, the radial opening in the hinge eye is disposed, with respect to the hinge pin, on the side thereof facing away from the outer sides of the temple headpiece and the endpiece, and that the two pin plates are connected by a connecting wall extending parallel to the axis of the hinge pin, being disposed on the outer side of the temple headpiece and the endpiece, respectively, and connecting the abutment parts formed on the pin plates to each other.

Further according to the invention, the hinge eye is formed so as to be substantially annular.

Further still according to the invention, the radial opening tapers in the form of a wedge in the direction of the hinge hole.

Further still according to the invention, the axis of the radial opening extends substantially perpendicularly to the outer side of the temple headpiece and the endpiece, respectively, located in the area of the hinge pin, when the temple headpiece takes up its position of use.

Further still according to the invention, the free front surfaces of the two abutment parts and of the connecting wall jointly form a second, U-shaped abutment face.

Further still according to the invention, the second abutment face is substantially plane.

Further still according to the invention, the hinge eye is connected to the temple headpiece or the endpiece by means of a plate-shaped component, and the first abutment face is formed at the transition between the plate-shaped component and the temple headpiece and the endpiece, respectively.

Further still according to the invention, the first abutment face has the shape of a "U".

Further still according to the invention, the hinge eye (18) is connected to the endpiece.

Further still according to the invention, the endpiece including the hinge eye is formed in one piece from the injection-moldable plastic material.

Further still according to the invention, the temple headpiece including the pin plates, the hinge pin and the connecting wall is formed in one piece from an injection-moldable plastic material.

The advantageous effects of the arrangement according to the invention as well as the features thereof are explained in greater detail in the following by means of a preferred embodiment shown in the figures of the drawing. They depict:

BRIEF DESCRIPTION OF THE DRAWINGS

FIG. 1 a top view, partly in section, of an embodiment of the arrangement according to the invention, wherein a temple headpiece is shown in its position of use relative to an endpiece;

FIG. 2, in a view similar to FIG. 1, a top view of the embodiment, wherein, however, a state in which the temple headpiece is pivoted inwards relative to the endpiece is shown;

FIG. 3 the endpiece of the embodiment according to FIGS. 1 and 2 in a perspective view when viewed at an angle from below;

FIG. 4, in an enlarged scale, a view of the free end portion of the temple headpiece when viewed in the direction of arrow D in FIG. 3; and FIG. 5 a view, similar to FIG. 2, of the state taken up by the temple headpiece and the endpiece before they are connected to each other.

DETAILED DESCRIPTION OF THE INVENTION

In a partly sectional top view, FIGS. 1 and 2 show, as embodiment of the arrangement according to the invention, an endpiece 2 of spectacles, a temple headpiece 4 of the spectacles as well as a hinge 6 for joining the endpiece 2 and the temple headpiece 4 such that the temple headpiece 4 and the endpiece 2 are pivotable relative to each other. FIG. 1 shows the temple headpiece 4 in its position of use, i.e. in that position which the temple headpiece 4 takes up relative to the endpiece 2 when the temples of the spectacles—not shown with the exception of the temple headpiece 4—are swiveled out or opened, so that the spectacle wearer can put the spectacles on and wear them. FIG. 2 shows the position of the temple headpiece 4 relative to the endpiece 2, which is taken up by the temple headpiece 4 when the temple is swiveled in or closed.

The hinge 6 comprises components which are explained in detail in the following. These components are either firmly connected to the endpiece 2, or to the temple headpiece 4. In the depicted embodiment, the endpiece 2 and the components of the hinge 6 firmly connected thereto, are manufactured in one piece from an injection-moldable plastic material, so that the components of the hinge 6 which are connected to the endpiece 2, are simultaneously components of the endpiece 2 and are described as such. Furthermore, in the depicted embodiment, the temple headpiece 4 and the components of the hinge 6 connected thereto, are manufactured in one piece from an injection-moldable plastic material, so that the components of the hinge 6 which are connected to the temple headpiece 4 are simultaneously components of the temple headpiece 4, and are described as such.

The endpiece 2, which is depicted as such in a view at an angle from below in FIG. 3, comprises a contact portion 8 which is to contact the front side of a spectacle lens 12 only depicted schematically by dash lines. A stud 10 is formed into one piece with the contact portion 8, said stud being seated in a through-hole in the spectacle lens 12 and being used for fixing the endpiece 2 on the spectacle lens 12. The details of the construction for connecting the endpiece 2 to the spectacle lens 12 are not important within the scope of the present invention, so that these details shall not be explained in any greater detail in the following.

As can be seen from the above description of the endpiece 2, the depicted endpiece is destined for so-called rimless spectacles. As a deviation from the depicted embodiment, the endpiece may, however, also be the endpiece of spectacles where the spectacle lenses are held in a frame, wherein, in the latter case, the endpiece is formed such that it is connected to the frame of the spectacles or a part thereof, or is designed in one piece therewith.

The contact portion 8 of the endpiece 2 merges into a curved portion 14 which is directed backwards from the contact portion 8, i.e. to the left in FIG. 1. The curved portion 14 is followed by a hinge portion 16 of the endpiece 2, which extends from the free end of the curved portion 14 further backwards, i.e. to the left in FIG. 1. The hinge portion 16 comprises an annular hinge eye 18 and a plate-shaped component 20 for connecting the hinge eye 18 to the curved portion 14. The upper side and the lower side of the hinge portion 16 extend parallel to the drawing plane of FIG. 1.

The temple headpiece 4 forms the front portion of the otherwise non-depicted temple of the spectacles and is either formed in one piece with a shaft of the temple or is fastened to a shaft of the temple in a suitable way. The temple headpiece 4 comprises an upper pin plate 22 as well as a lower pin plate 24 which are formed in one piece with the remaining temple headpiece 4. The hinge eye 18 is disposed between the two pin plates 22 and 24, and the two pin plates 22 and 24 extend parallel to the hinge portion 16. A circular cylindrical hinge pin 26 extends between the two pin plates 22 and 24 and perpendicular thereto. It is connected to the upper pin plate 22 at its one end, the upper end in FIG. 4, and is connected to the lower pin plate 24 at its other end, the lower end in FIG. 4. It is one of the objects of the two pin plates 22 and 24 to hold the hinge pin 26; therefore, they are here designated as pin plates.

A hinge hole 28 is formed in the hinge eye 18. The hinge pin 26 is inserted into the hinge hole 28, wherein there is a clearance fit or a transition fit between the hinge pin 26 and the hinge hole 28, so that the hinge pin 26 can be rotated about a hinge axis, which coincides with the axis of the hinge pin 26 and the axis of the hinge hole 28, in the hinge hole 28.

The components of the hinge 6 of the above-described arrangement are, thus, the hinge eye 18 with its hinge hole 28, the hinge pin 26 as well as the two pin plates 22 and 24.

Due to the above-described formation of the arrangement, the temple headpiece 4 can be pivoted from its position shown in FIG. 2 in the direction of the arrow A marked on FIG. 1 about the hinge axis of the hinge 6 into its position of use. The side of the temple headpiece 4 going ahead in the direction of the arrow A, when pivoted, forms the outer side 30 thereof, which is located on the temple headpiece 4 below in FIG. 1. Also the endpiece 2 has an outer side 32. This is the side consecutive to the outer side 30 of the temple headpiece 4 when the latter takes up its position of use, as this is shown in FIG. 1. The outer side 32 of the endpiece 2 is located at the surface thereof facing away from the stud 10.

When the temple headpiece 4 is pivoted relative to the endpiece 2, the hinge eye 18 is guided by the two pin plates 22 and 24 which are in contact with the plane upper and lower sides of the hinge portion 16. Each of the two pin plates 22 and 24 is provided with a semicircular projection 34 on the inner side of the temple headpiece 4 facing away from the outer side 30, the radius of said projection being approximately equal to the radius of the radially outer surface of the hinge eye 18. In this way, it is ensured that the hinge eye 18 is supported by the two pin plates 22 and 24 on its entire upper side and its entire lower side.

A radial opening 36 is formed in the hinge eye 18. The radial opening 36 extends in the radial direction with regard to the hinge axis of the hinge 6 from the hinge hole 28 to the radially outer surface of the hinge eye 18 and is, thus, open radially inwards as well as radially outwards. Furthermore, the radial opening 36 extends over the whole thickness of the hinge eye 18, i.e. over the whole axial length of the hinge hole 28. The radial opening 36 tapers in the form of a wedge radially inwards and is limited by two plane surfaces. The hinge pin 26 and the radial opening 36 are dimensioned such that the hinge pin 26 is insertable through the radial opening 36 in the radial direction into the hinge hole 28. This insertion process is illustrated by FIG. 5 which shows the temple headpiece 4 and the endpiece 2 in a state separated from each other. The temple headpiece 4 can be moved from its position shown in FIG. 5 in the direction of an arrow B towards the hinge eye 18 until the hinge pin 26 is inserted through the radial opening 36 into the hinge hole 28. The radial opening 36 has its narrowest portion radially inwards. At this narrowest portion, the radial opening 36 has a width smaller than the diameter of the cylindrical hinge pin 26. This ensures that the hinge pin 26 is held in the hinge hole 28. The widening of the radial opening 36 at its narrowest portion, required during the insertion or positioning of the hinge pin 26 into the hinge hole 28 is guaranteed due to the elasticity of the plastic material from which the hinge eye 18 and, in the case of the depicted embodiment, the whole endpiece 2 are manufactured.

The radial opening 26 is formed in the hinge eye 18 such that it is disposed, regarding the hinge pin 26, on the side thereof facing away from the outer side 30 of the temple headpiece 4 when the temple headpiece 4 takes up its position of use shown in FIG. 1. In other words, this means that the radial opening 36 opens from the hinge hole 28 towards the inner side of the temple headpiece 14, i.e. away from the outer side 30, as this is shown in FIG. 1. In the shown embodiment, the axis of the radial opening 36, i.e. the center line of the radial opening 36, which is perpendicular to the hinge axis, extends at an approximately right angle to the area of the outer side 30, which is adjacent to the hinge pin 26.

The arrangement comprises an abutment device to prevent the temple headpiece 4 from pivoting beyond its position of use shown in FIG. 1 in the direction of the arrow A. The abutment device comprises an abutment face 38 formed at the transition between the plate-shaped component 20 of the hinge portion 16 and the curved portion 14 of the endpiece 2, as this can be seen in FIG. 3, in particular. The abutment face 38 is substantially plane and U-shaped in the depicted embodiment, and extends from the upper side of the plate-shaped component 20 around the outer side thereof towards the lower side of the plate-shaped component 20.

Furthermore, the abutment device comprises two abutment parts 40 which are each formed by the free end portion of the upper pin plate 22 and the lower pin plate 24. When the temple headpiece 4 takes up its position of use shown in FIG. 1, the two abutment parts 40 abut with their free front surfaces 42 on the endpiece 2. The areas in which the abutment parts 40 are in contact with the abutment face 38 have a lesser distance from the outer side 30 of the temple headpiece 4 than the hinge axis of the hinge 6. Thus, the abutment of the abutment parts 40 on the abutment face 38 serves to avoid that the temple headpiece 4 can be pivoted in the direction of the arrow A beyond the position of use shown in FIG. 1.

Furthermore, the temple headpiece 4 comprises a connecting wall 44 for connecting the two pin plates 22 and 24 to each other. The connecting wall substantially extends parallel to the hinge axis of the hinge 6 and is disposed on the outer side 30 of the temple headpiece 4. At its end which is on the left-hand side in FIG. 1, the connecting wall 44 directly merges into the remaining temple headpiece 4. The connecting wall 44 extends in the direction of the free end of the temple headpiece 4, arranged at the bottom of FIGS. 2 and 5, such that its free end portion 46 is disposed between the two abutment parts 40, connects the same to each other, and forms an abutment part in its turn. The free end surface 48 located on the end portion 46 of the connecting wall 44 merges into the free end surfaces 42 of the abutment parts 40 and forms, together with the free end surfaces 42, a second abutment face which is entirely in contact with the first abutment face 38 when the temple headpiece 4 takes up its position of use shown in FIG. 1. Like the first abutment face 38, the second abutment face is substantially U-shaped and plane (see FIG. 4).

The above-described arrangement consisting of the endpiece 2, temple headpiece 4 and the hinge 6 has the advantage that the temple headpiece 4 and the endpiece 2 can be connected to each other in a simple way by the hinge pin 26 being pushed or snapped into the hinge hole 28 in the hinge eye 18.

The connecting wall 44, which connects the two pin plates 22 and 24 to each other, prevents a deformation of the two pin plates 22 and 24 when the arrangement is put under a mechanically great strain, for example by forces which attempt to displace the temple headpiece 4 beyond its position of use depicted in FIG. 1 or which act at the non-depicted end of the endpiece on the same perpendicularly to the drawing plane of FIG. 1. In particular, the connecting wall 44 holds the two abutment parts 40 in their desired position, so that these reliably remain in abutment with the first abutment face 38, even if they are pressed against the first abutment face 38 with a comparatively great force. Besides, the free end surface 48 of the free end portion 46 of the connecting wall 44 enlarges the second abutment face. A pivoting of the temple headpiece 4 beyond its position of use shown in FIG. 1 is further prevented by the free end portion 46 getting in abutment with the plate-shaped component 20, as the case may be. Thus, the abutment device is reinforced as a whole and is improved in its reliability and effect.

When the temple headpiece 4 takes up its position of use depicted in FIG. 1 and, in the direction of the arrow A, a force acts on the temple headpiece 4 to attempt to pivot it beyond its position of use, said further pivoting is prevented by the abutment device. The hinge pin 26 is then pressed into the hinge hole 28 such that it exerts a force C onto the wall of the hinge hole 28, the direction of which is shown by the arrow assigned to force C in FIG. 1. Force C is taken up by the hinge eye 18 and substantially acts in the direction of the outer side 30 of the temple headpiece 4 and, thus, in a direction which is opposite to the direction in which the radial opening starts out from the hinge hole 28. Thus, force C cannot lead to the hinge hole 28 being widened and the hinge pin 26 being partly or wholly moved from the hinge hole 28 into the radial opening 36. Thus, the described alignment of the radial opening 36 relative to the other elements of the arrangement serves to avoid a loosening of the hinge 6 or even a breakage of the hinge eye 18.

The plate-shaped component 20 may differ from the above-described embodiment in that it may be formed shorter than shown, or may be omitted completely.

Other than in the above-described embodiment, the components of the hinge 6 may be arranged on the endpiece 2 and the temple headpiece 4 "the other way round", that is such that the hinge pin 26 and the pin plates 22 and 24 are firmly connected to the endpiece and that the hinge eye 18 is firmly connected to the temple headpiece 4.

Differently from the above-described embodiment, the hinge pin may be manufactured as separate component which is mounted on the temple headpiece 4 in the course of the manufacture of the same.

Further modifications of the above-described embodiment are possible within the scope of the definition of the invention given by the claims.

An arrangement for spectacles comprises an endpiece and a temple headpiece as well as a hinge for joining the endpiece and the temple headpiece in an articulated manner such that the temple headpiece is pivotable into a position of use. The hinge comprises a hinge eye made of an injection-moldable plastic material having a hinge hole, a hinge pin rotatably inserted into the hinge hole as well as two pin plates between which the hinge eye is disposed. A radial opening is formed in the hinge eye, said radial opening extending in the radial direction with respect to the hinge hole from the same to the radially outer surface of the hinge eye. The hinge pin has been inserted into the hinge hole in the radial direction through the radial opening. With respect to the hinge pin, the radial opening in the hinge eye is disposed on the side thereof which faces away from the outer sides of the temple headpiece and of the endpiece, when the temple headpiece takes up its position of use. An abutment device comprises an abutment face connected to the hinge eye as well as abutment parts formed on the pin plates. The two pin plates are connected by a connecting wall extending on the outer side of the temple headpiece or the endpiece parallel to the axis of the hinge pin and connecting the abutment parts to each other.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. An arrangement having an endpiece (2) for spectacles, comprising a temple headpiece (4) for the spectacles and a hinge (6) for joining the endpiece and the temple headpiece in an articulated manner such that the temple headpiece is pivotable relative to the endpiece into a position of use, wherein the side of the temple headpiece which goes ahead when the pivoting into the position of use takes place forming the outer side of the temple headpiece and with the side of the endpiece adjoining the outer side (30) of the temple headpiece, when the latter takes up its position of use, forming the outer side (32) thereof, wherein the hinge includes a hinge eye (18) having a hinge hole (28), a hinge pin (26) rotatably inserted in the hinge hole as well as two pin plates (22, 24) between which the hinge eye is disposed and the one of which is connected to the one end and the other is connected to the other end of the hinge pin, wherein the two pin plates are firmly connected to the endpiece or the temple headpiece and the hinge eye is firmly connected to the respectively other of the temple headpiece or endpiece, wherein the hinge eye consists of an injection-moldable plastic material and has a radial opening (36) which extends in the radial direction with respect to the hinge hole, is open radially inwards and outwards and extends over the entire axial length of the hinge hole, wherein the radial opening and the hinge pin are dimensioned such that the hinge pin is insertable through the radial opening in the radial direction into the hinge hole and is removable therefrom, wherein the arrangement comprises an abutment device having an abutment face (38) connected to the hinge eye as well as abutment parts (40) formed on the pin plates, said abutment parts being adapted to abut on the abutment face and, thereby, preventing a swivel movement of the temple headpiece beyond its position of use, characterized in that, when the temple headpiece (4) takes up its position of use, the radial opening (36) in the hinge eye (18) is disposed, with respect to the hinge pin (26), on the side thereof facing away from the outer sides (30, 32) of the temple headpiece (4) and the endpiece (2), and that the two pin plates (22, 24) are connected by a connecting wall (44) extending parallel to the axis of the hinge pin (26), being disposed on the outer side (30, 32) of the temple headpiece (4) and the endpiece (2), respectively, and connecting the abutment parts (40) formed on the pin plates to each other.

2. An arrangement according to claim 1, characterized in that the hinge eye (18) is formed so as to be substantially annular.

3. An arrangement according to claim 1, characterized in that the radial opening (36) tapers in the form of a wedge in the direction of the hinge hole (28).

4. An arrangement according to claim 1, characterized in that the axis of the radial opening (36) extends substantially perpendicularly to the outer side (30, 32) of the temple headpiece (4) and the endpiece (2), respectively, located in the area of the hinge pin (26), when the temple headpiece (4) takes up its position of use.

5. An arrangement according to claim 1, characterized in that the free front surfaces (42, 48) of the two abutment parts (40) and of the connecting wall (44) jointly form a second, U-shaped abutment face.

6. An arrangement according to claim 5, characterized in that the second abutment face is substantially plane.

7. An arrangement according to claim 1, characterized in that the hinge eye (18) is connected to the temple headpiece (4) or the endpiece (2) by means of a plate-shaped component (20), and the first abutment face (38) is formed at the transition between the plate-shaped component (20) and the temple headpiece and the endpiece, respectively.

8. An arrangement according to claim 1, characterized in that the first abutment face (38) has the shape of a "U".

9. An arrangement according to claim 1, characterized in that the hinge eye (18) is connected to the endpiece (2).

10. An arrangement according to claim 9, characterized in that the endpiece (2) including the hinge eye (18) is formed in one piece from the injection-moldable plastic material.

11. An arrangement according to claim 10, characterized in that the temple headpiece (4) including the pin plates (22, 24), the hinge pin (26) and the connecting wall (44) is formed in one piece from an injection-moldable plastic material.

* * * * *